(No Model.)
A. M. ZIEGLER.
ELASTIC CORD AND METHOD OF MAKING SAME.
No. 563,001. Patented June 30, 1896.
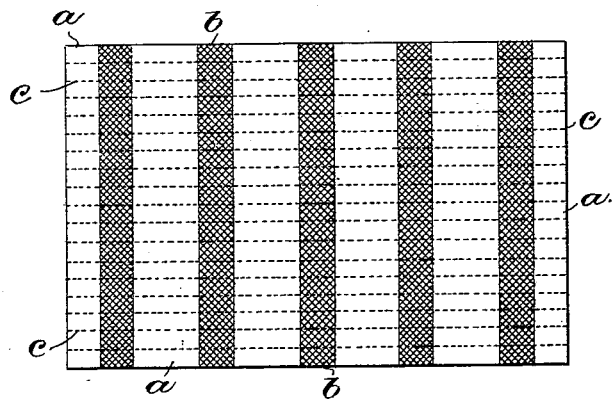
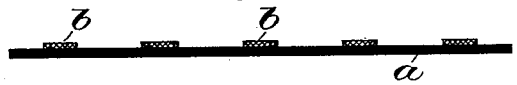
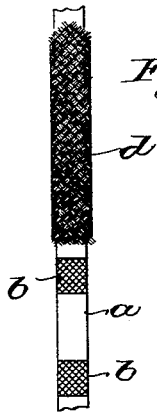
Witnesses.
A. C. Harmon
Thomas Drummond
Inventor
Alfred M. Ziegler.
by Crosby & Gregory. Attys.

UNITED STATES PATENT OFFICE.

ALFRED M. ZIEGLER, OF BOSTON, MASSACHUSETTS.

ELASTIC CORD AND METHOD OF MAKING SAME.

SPECIFICATION forming part of Letters Patent No. 563,001, dated June 30, 1896.

Application filed March 11, 1895. Serial No. 541,224. (No specimens.)

*To all whom it may concern:*

Be it known that I, ALFRED M. ZIEGLER, of Boston, county of Suffolk, State of Massachusetts, have invented an Improvement in Elastic Cord and Method of Making the Same, of which the following description, in connection with the accompanying drawings, is a specification, like letters on the drawings representing like parts.

This invention has for its object the production of a covered elastic cord having an elastic core reduced in elasticity at intervals in the direction of its length by non-elastic fabric applied to the elastic material, the case or cover consisting, preferably, of fibrous material braided or woven upon the core. By this construction I am enabled to produce a cord with a core having alternating elastic and non-elastic sections in the direction of its length.

The method of making the cord also forms a part of my invention.

In accordance therewith my invention consists in a covered elastic cord having a core consisting of an elastic body, reduced in elasticity at intervals in the direction of its length by non-elastic material incorporated thereinto and adhering thereto, substantially as will be described.

Other features of my invention will be hereinafter described, and particularly pointed out in the claims.

Figure 1 represents a sheet of elastic material with strips of non-elastic fabric applied thereto from which I form the cord. Fig. 2 is a longitudinal edge view thereof prior to incorporating the elastic and non-elastic material. Fig. 3 is a similar view after such incorporation has been effected; and Fig. 4 is a view, on a larger scale, of a piece of cord embodying my invention, the covering being shown as unfinished at one end to expose a portion of the core.

In carrying out my invention in the simplest manner now known to me, I take a sheet or strip of rubber $a$ of suitable dimensions, the thickness depending upon the size of the cord to be made, and apply thereto at intervals a series of transverse strips $b$ of non-elastic fabric, such as stout cloth, canvas, &c., temporarily securing them to the rubber, if desired, by suitable cement.

The sheet or strip so prepared, having substantially the appearance shown in Fig. 2 when viewed edgewise, is then subjected to pressure, either in a mold or die, or by passing between rolls, to press the non-elastic fabric $b$ into and to incorporate it with the rubber, as shown in Fig. 3.

After incorporating the two materials I preferably cure or vulcanize the rubber in any usual or well-known manner, and thereafter cut the compound sheet into strips along the dotted lines $c$, Fig. 1, the width of the strips being determined by the shape and cross-sectional area desired for the core, the lines of division being longitudinal of the sheet and cutting the non-elastic portions of fabric $b$ substantially at right angles, as shown. The strips are thereafter covered with a fibrous or other suitable case or jacket woven or braided thereon, as at $d$, Fig. 4, to completely envelop the core from end to end in a tubular covering, and I thus produce a covered cord with a continuous core having alternating elastic and non-elastic portions in the direction of its length, the outer covering $d$ protecting and permitting elongation of the cord up to a certain point, and acting as a limiting device to prevent undue stretching.

While I have herein shown the portions of non-elastic fabric $b$ as narrower than the intervening portions of elastic material, this arrangment may be reversed, or the non-elastic portions may be equal in length to the intervening elastic portions, and so too the strips of the compound fabric may be cut diagonally to the portions $b$, if desired, without departing from the spirit and scope of my invention.

It is to be understood that while I prefer to make the cord as hereinbefore described on account of cheapness and rapidity, I may take a strip of rubber of proper width for a single cord, apply portions of non-elastic fabric thereto at intervals, and incorporate the latter with the elastic material, thereafter vulcanizing and covering the strip so made.

I claim—

1. A core for elastic cord, consisting of an elastic body reduced in elasticity at intervals in the direction of its length by non-elastic material adhering to the substance thereof, substantially as described.

2. An elastic cord, comprising a core consisting of an elastic body reduced in elasticity at intervals in the direction of its length by non-elastic material incorporated thereinto, and an outer covering for the core of fibrous material, substantially as described.

3. The herein-described method of making covered elastic cord, which consists in applying to a strip of elastic material non-elastic fabric at intervals, incorporating the latter with the elastic material, vulcanizing the strip, and thereafter applying a fibrous cover thereto, substantially as described.

4. The herein-described method of making covered elastic cord, which consists in applying to a sheet of elastic material transverse strips of non-elastic fabric at intervals, incorporating said fabric with the elastic material by pressure, vulcanizing the compound sheet, separating it into strips longitudinally, and covering said separated strips with fibrous material, substantially as described.

In testimony whereof I have signed my name to this specification in the presence of two subscribing witnesses.

ALFRED M. ZIEGLER.

Witnesses:
JOHN C. EDWARDS,
AUGUSTA E. DEAN.